(12) United States Patent
Hodges

(10) Patent No.: US 9,744,908 B1
(45) Date of Patent: Aug. 29, 2017

(54) TRUCK STEP

(71) Applicant: Frank Hodges, Corona, CA (US)

(72) Inventor: Frank Hodges, Corona, CA (US)

(*) Notice: Subject to any disclaimer, the term of this patent is extended or adjusted under 35 U.S.C. 154(b) by 0 days.

(21) Appl. No.: 15/159,633

(22) Filed: May 19, 2016

Related U.S. Application Data

(60) Provisional application No. 62/163,855, filed on May 19, 2015, provisional application No. 62/215,922, filed on Sep. 9, 2015.

(51) Int. Cl.
| | | |
|---|---|---|
| *B60R 3/00* | (2006.01) | |
| *B60R 19/42* | (2006.01) | |
| *B62D 65/16* | (2006.01) | |

(52) U.S. Cl.
CPC .................... *B60R 3/002* (2013.01)

(58) Field of Classification Search
CPC .. B60R 3/00; B60R 3/002; B60R 3/02; B60R 19/42; B62D 65/16
See application file for complete search history.

(56) References Cited

U.S. PATENT DOCUMENTS

| | | | | |
|---|---|---|---|---|
| 4,121,691 A * | 10/1978 | Poplawski | ................ | B60R 3/00 182/90 |
| 4,943,085 A * | 7/1990 | Straka | ................ | B60R 3/00 182/92 |
| 5,007,654 A * | 4/1991 | Sauber | ................ | B60R 3/02 182/89 |
| 5,137,294 A * | 8/1992 | Martin | ................ | B60R 3/02 280/166 |
| 6,588,783 B2 * | 7/2003 | Fichter | ................ | B60R 3/00 280/163 |

* cited by examiner

*Primary Examiner* — Bryan Evans
(74) *Attorney, Agent, or Firm* — Eric B. Alspaugh

(57) ABSTRACT

The present invention is directed to a truck step that is typically used with a lifted truck. The steps on the truck step have additional space for receiving a user's foot, shoe, or boot. The additional space is created by compressing a main bar on its bottom surface thereby creating an indentation in the main bar just above the truck step. The utility of the present invention is related to improving access to the truck step while at the same time providing a low profile appearance that does not distract or diminish the appearance of a lifted truck with a low hanging step.

7 Claims, 17 Drawing Sheets

TRUCK STEP

FIELD OF THE INVENTION

The present invention is in the field of steps for lifted vehicles in particular trucks that have the appearance of a high lift with a smooth appearance.

BACKGROUND

Stepping platforms are typically provided for lifted trucks to assist in safely entering and exiting of vehicles. Presently, most vehicle steps are fixed to the body or frame of a vehicle and project downwardly and away from the door. On uneven or sloping terrain, present forms of vehicle steps comport with the orientation of the vehicle. If the vehicle is driven over bumpy uneven terrain or in off-road areas where rocks, ditches or other obstacles are present, rigidly mounted hanging steps can be bent or broken off the vehicle.

While These

Although various improvements are known to the art, all, or almost all of them suffer from one or more than one disadvantage. Therefore, there is a need to provide an improved truck step.

RELEVANT ART REFERENCES

Examples of exposed running boards include those shown in U.S. Pat. Nos. 4,021,055; 4,167,272; 4,203,611; 4,257,620; 4,311,320; 4,451,063; 4,456,275; 4,463,962; 4,838,567; and 4,934,721.

U.S. Pat. No. 4,607,878 to Itoh discloses a synthetic resin rocker panel element for attachment to automobiles. While acceptable for its intended purpose, this arrangement fails to afford a meaningful weight bearing step concealed when the automobile door is closed.

U.S. Pat. No. 3,684,311 to Pierce shows a mud guard strip attachment for the rocker panel body area of an automobile but fails to provide for a weight bearing step attached to the automobile frame.

U.S. Pat. No. 5,007,654 issued to Suaber discloses a rotatable vehicle step.

Holden, in U.S. Pat. No. 3,853,369, describes folding steps connected to the tailgate of a vehicle such that the steps are moved from a horizontal operative position when the tailgate is lowered and are moved to a substantially vertical storage position when the tailgate is raised. A lower step is secured to rigid angle members suspended from an intermediate step which is pivoted to the vehicle. The lower step is maintained in a horizontal position by adjustable braces connected through a linkage to permit folding to a collapsed position when the tailgate is raised.

U.S. Pat. No. 3,961,809 by Clugston discloses a tailgate-mounted safety step assembly for pickup trucks, which includes a linkage assembly coupled with a step for permitting shifting of the latter between a storage position and a lowered horizontal use position. In conjunction, a selectively engageable clutch lock operates to securely lock the step in the use position when a person mounts the step. The structure allows the lowered step to shift fore-and-aft when not in use in order to accommodate any road obstructions which may be encountered. By virtue of the unique clutch lock employed, the step assembly may be utilized without fear of instability or unsteadiness, notwithstanding the fact that the lowered step is movable when struck by an obstruction in order to preclude damage to the overall assembly. In preferred forms, the assembly includes parallelogram linkage, having a split shaft clutch lock secured to the step and telescoped over a transverse, axially rotatable pivot member of the linkage assembly. When a person mounts the step, the clutch lock engages the pivot member to releasably hold the latter and thereby temporarily rigidify the entire step assembly to permit safe use thereof.

In U.S. Pat. No. 3,889,997, Shoneck discloses a truck end gate step unit that is attached by four brackets, two on the bumper or transverse frame member if no bumper is present, and two on the upper edge of the end gate. A universal mounting plate is provided upon each side of the step, with hanger straps extending up to the brackets on the tail gate and hanger straps extending back to the brackets on the bumper or frame member. The anchor straps are adjustable in length and in their attachment to the mounting plates. The hanger straps can be pivotally secured in any one of several apertures in the mounting plate above the securement of the anchor straps.

Burdette, Jr., in U.S. Pat. No. 5,205,603, describes a ladder assembly that is mounted slidably and telescopingly within a tailgate portion of a truck bed. The ladder assembly includes first and second ladder members extensibly mounted relative to the tailgate and, more specifically, to a cavity there within. The ladder assembly provides ease of access to the truck bed, with a handrail connected to the truck bed and tailgate for stability when using the ladder assembly.

U.S. Pat. No. 5,803,475 by Dick discloses a receiver hitch step attachment that mounts to the existing receiver hitch of a pickup truck and supports a set of steps that are adjustable laterally and vertically. An auxiliary stabilizer leg is provided for engaging the ground beneath the attachment when the truck is parked, in order to support the vehicle against rocking when weight is applied to the steps or when moving about in the camper.

In U.S. Pat. No. 5,897,125, Bundy describes a truck step securable to a vehicle via a mounting bracket and having a step arm capable of swiveling between a "storage" position underneath the vehicle and an "in use" position where the step arm extends outward from under the vehicle. One end of the step arm is provided with a step plate where a user's foot may be placed when stepping into the vehicle, and an opposite end of the step arm is provided with a lower swivel plate which swivels relative to an upper swivel plate provided on the mounting bracket. The lower and upper swivel plates have mating valleys and ridges to lock the step in one of several positions.

Maxwell et al., in U.S. Pat. No. 6,170,843, describe a step holding member having a first end, which is insertable into a receiver-type trailer hitch, and a second end, which is adapted for holding a step member for stepping onto the tailgate of a pickup truck. In another embodiment, the step holding member telescopes in and out toward a side of a pickup truck allowing for easy storage when telescoped in. In a third embodiment the step holding member folds inwards from the pickup toward the trailer hitch for storage. A fourth embodiment is adapted for mounting directly onto a trailer hitch draw bar so that the hitch may be used for towing with the step in place for use.

U.S. Pat. No. 6,237,927 by Debo discloses a pull out step which can be extended directly to the rear of a pickup truck making it possible to step from the ground to the tread of the step and then to the tailgate of the truck. A bracket attached to a trailer hitch on the truck slidably supports a beam which supports the tread and allows the beam to be locked in either the extended or retracted positions. For use with trucks having an unusually high chassis, the beam may include a gooseneck to lower the elevation of the tread to approximately one half the elevation of the tailgate.

Simpson, in U.S. Pat. No. 6,270,139, describes an extendable tailgate ladder assembly for providing improved accessibility for truck beds. The extendable tailgate ladder assembly includes a ladder, a pair of tracks, a pair of feet, a cover member, a plurality of first connection members and a plurality of second connection members. The ladder assembly stores vertically against the tailgate when not in use.

Armstrong et al., in U.S. Pat. No. 6,422,342, describe a stowable step having a housing, a U-shaped step platform and a sliding member pivotally engaging the step platform. The sliding member is slidably mounted within the housing for reciprocating movement between a retracted, stowed position where the platform extends into the housing and a deployed position where the platform can pivot relative to the sliding member to a substantially vertical position.

U.S. Pat. No. 6,474,668 by Debo discloses a pull out step which can be extended directly to the rear of a pickup truck, making it possible to step from the ground to the tread of the step and then to the tailgate of the truck. A bracket attached to a trailer hitch on the truck slidably supports a beam which supports the tread and allows the beam to be locked in either the extended or retracted positions. For use with trucks having an unusually high chassis, the beam may include a gooseneck to lower the elevation of the tread to approximately one half the elevation of the tailgate. The bracket may also be attached directly to the body of the truck.

In U.S. Pat. No. 6,530,588, Varney et al. describe a vehicle step apparatus for allowing a user easy access to pickup beds and sport utility vehicle cargo areas. The vehicle step apparatus includes a step support assembly that has a mounting assembly that is coupled to the vehicle. A support member is slidably coupled to the mounting assembly such that a distal end of the support member is slidably positioned with respect to the mounting assembly. A step support frame is coupled to the distal end of the support member such that the step support frame extends downwardly from the distal end of the support member. A step member is removably coupled to the step support frame opposite the support member. A step plate is coupled to a distal end of the step member, such that the step plate is designed for supporting the weight of a user stepping into the vehicle.

Erickson, in U.S. Pat. No. 6,682,086, describes a step platform assembly for attachment to a vehicle hitch assembly. The platform assembly includes a planar step platform member rigidly fastened to a coplanar linear step support member having an aperture adjacent a step support member end opposite the step platform member. The aperture contains a bushing member with the planar step platform member and step support member assembly adapted for rotatable connection to the hitch assembly by a fastener there between. A locking system is present for selectively securing the step platform member and linear step support member either beneath a vehicle body or exterior a vehicle body.

U.S. Patent Application No. 2002/0070577, by Pool, III et al., discloses a tailgate step apparatus that includes a tailgate with an inner edge and an outer edge. A first channel is affixed within the tailgate so as to extend between the inner and outer edges, and a second channel is affixed within the tailgate so as to extend between the inner and outer edges in a generally parallel spaced relationship to the first channel. A frame assembly is slidably received within the tailgate between the first and second channels so as to be movable between a first position within the tailgate to a second position extending outwardly of the tailgate. A step member is pivotally connected to the frame so as to have a surface positioned outwardly of the outer edge of the tailgate when the frame assembly is in the second position. The step member is movable so as to assume a horizontal orientation when the frame assembly is in the second position. The frame assembly is retractable along the first and second channels so as to be received interior of the tailgate.

These publications and all other referenced patents are incorporated herein by reference in their entirety. Furthermore, where a definition or use of a term in a reference, which is an incorporated reference here, is inconsistent or contrary to the definition of that term provided herein the definition of the term provided herein applies and the definition of that term in the reference does not apply.

SUMMARY OF THE INVENTION

In view of the shortcomings of the prior art, it is an object of this invention to provide a truck step which allows a user to easily enter and exit a vehicle while maintaining visual appearance of a highly lifted truck.

Another object of this invention is to provide a vehicle step which presents a stepping platform with enhanced safety characteristics.

An additional object is to provide an intermediate step between the ground and the vehicle upon which the invention is mounted to facilitate ease and safety in entering and exiting the vehicle. It is to be understood that the foregoing general description and the following detailed description are exemplary and explanatory only and are not to be viewed as being restrictive of the present invention, as claimed. Further advantages of this invention will be apparent after a review of the following detailed description of the disclosed embodiments and in the appended claims.

DETAILED DESCRIPTION OF THE EMBODIMENTS

Figure 1:
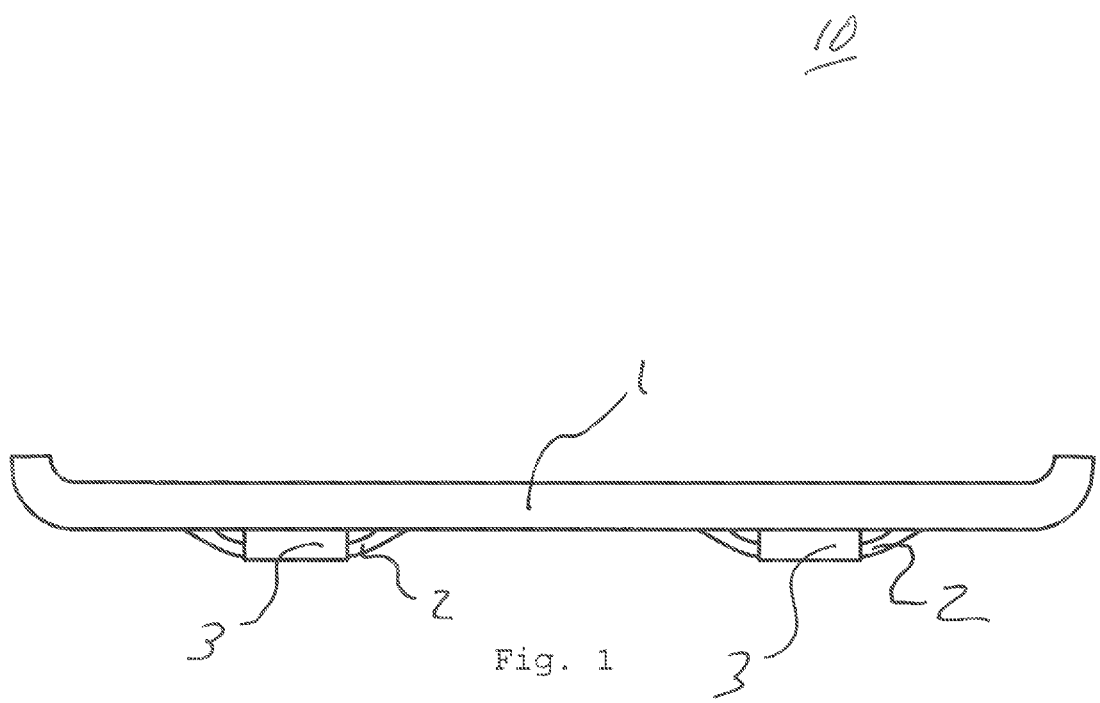
FIG. 1 shows a preferred embodiment of a truck step from a top perspective.
Figure 2:
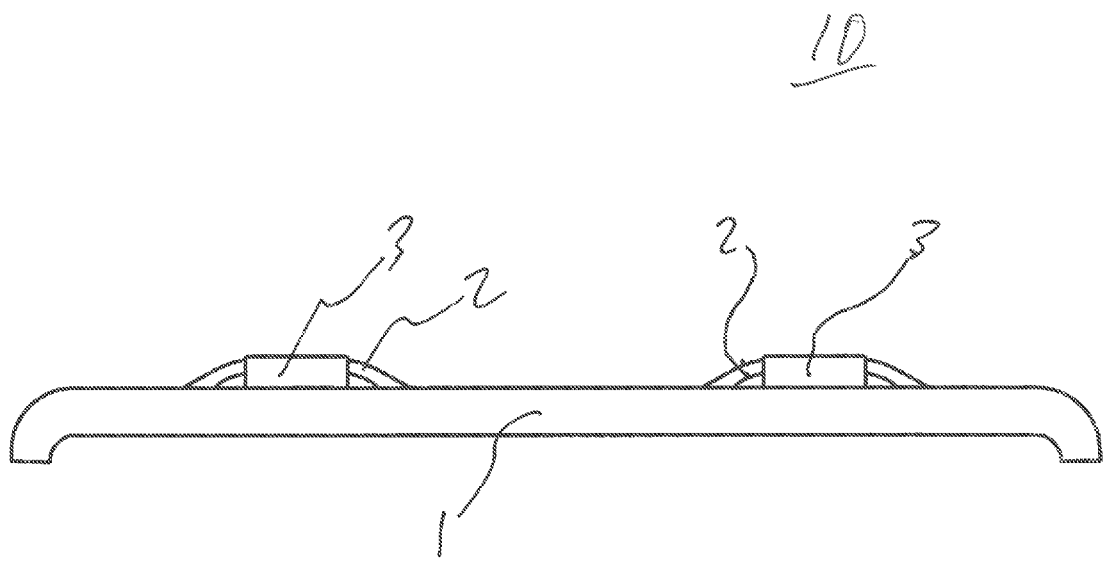
FIG. 2 shows a preferred embodiment of a truck step from a bottom perspective.
Figure 3:
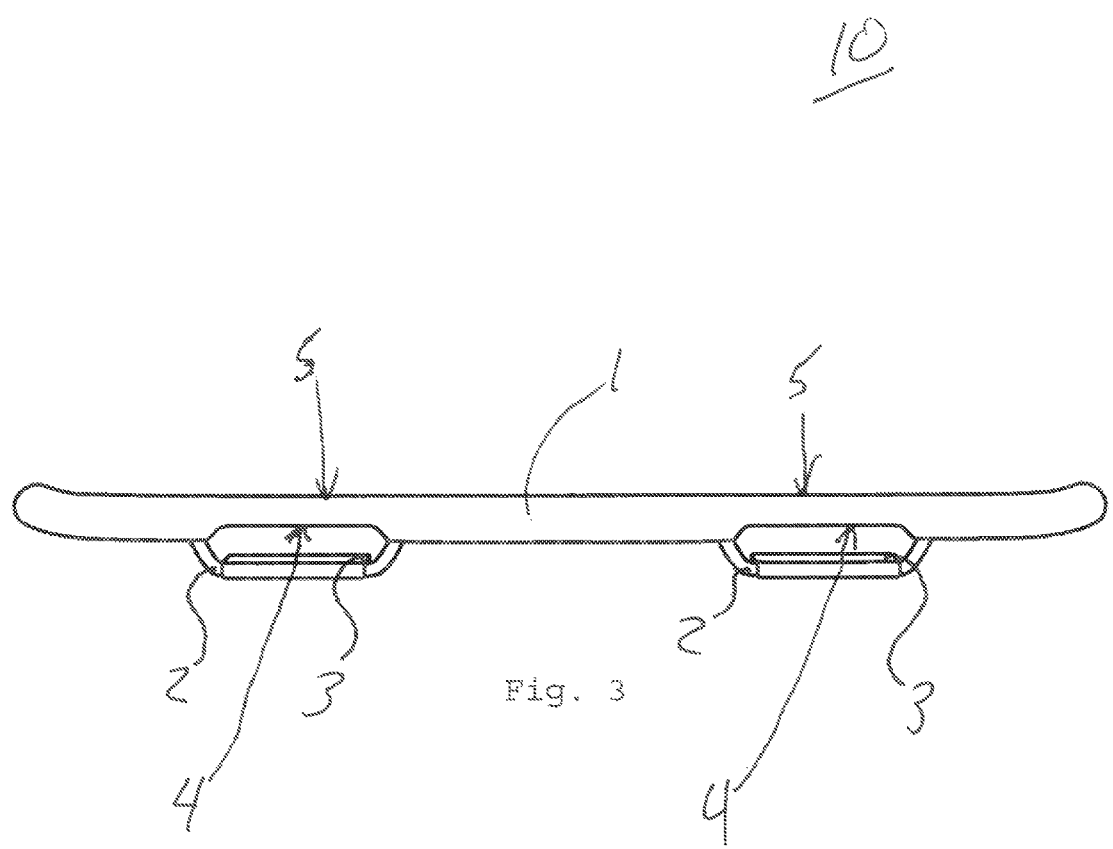
FIG. 3 shows a preferred embodiment of a truck step from a front perspective.
Figure 4:
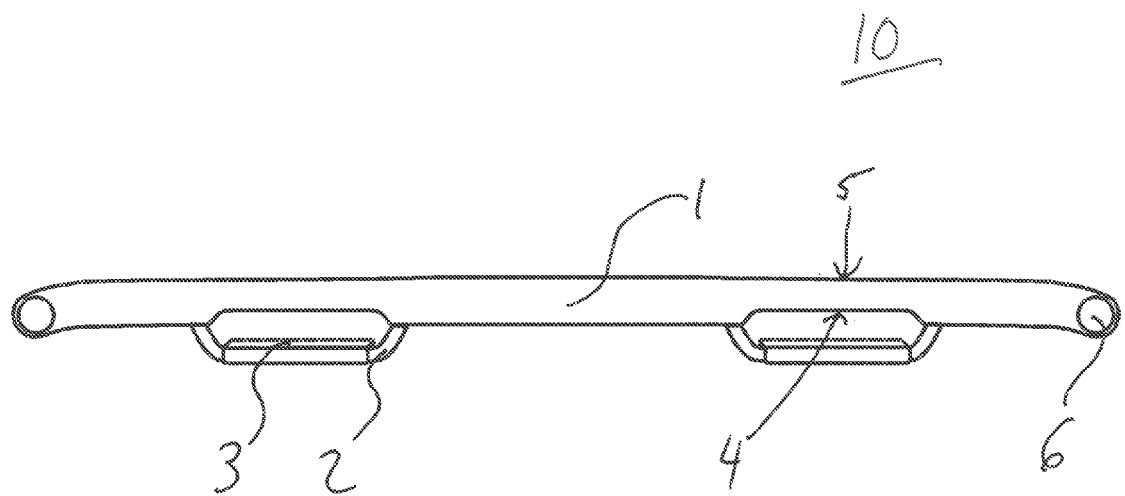
FIG. 4 shows a preferred embodiment of a truck step from a rear perspective.
Figure 5:
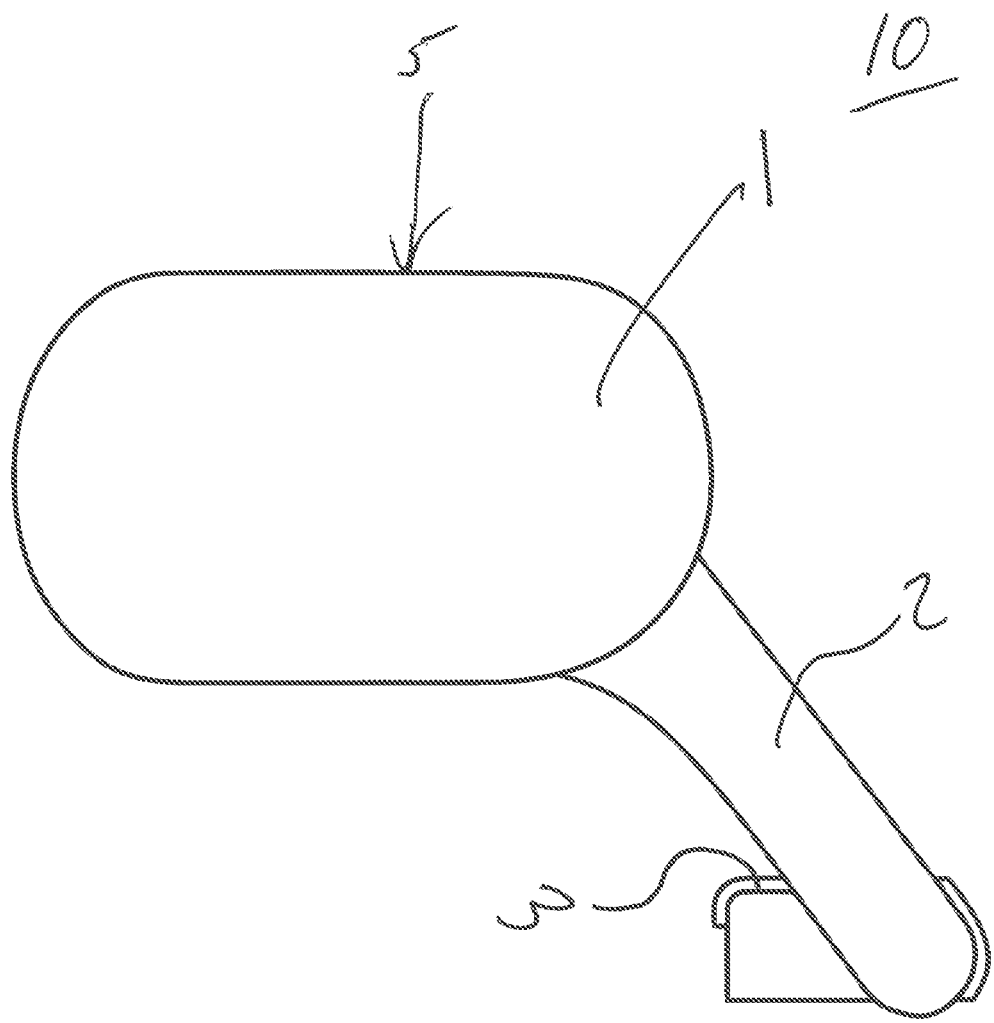
FIG. 5 shows a preferred embodiment of a truck step from a leading end perspective.
Figure 6:
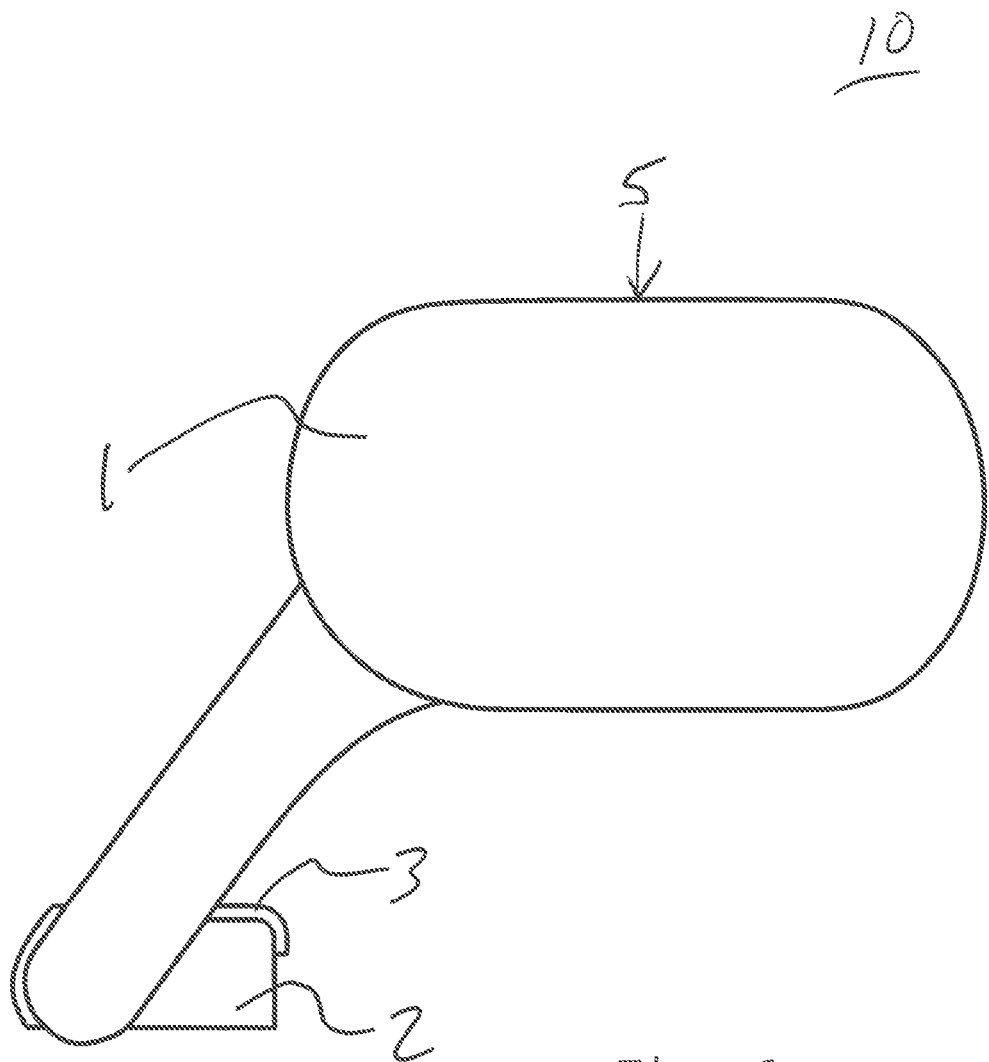
FIG. 6 shows a preferred embodiment of a truck step from a trailing end perspective.
Figure 7:
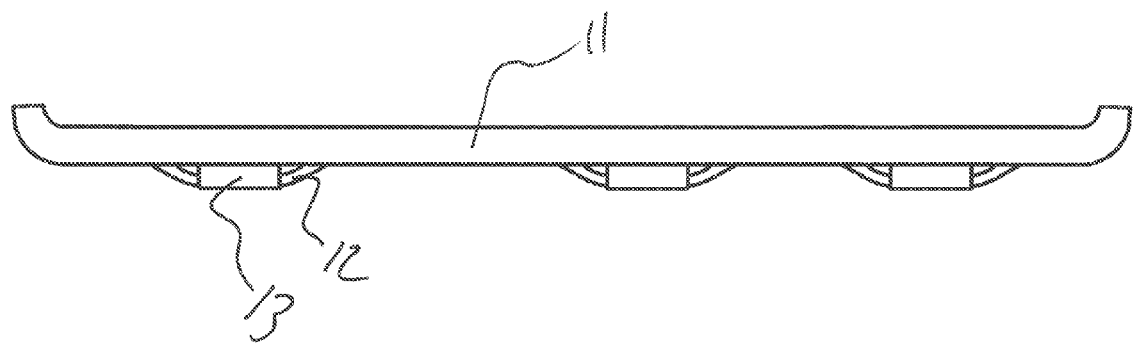
FIG. 7 shows an alternative preferred embodiment of a truck step from a top perspective.
Figure 8:
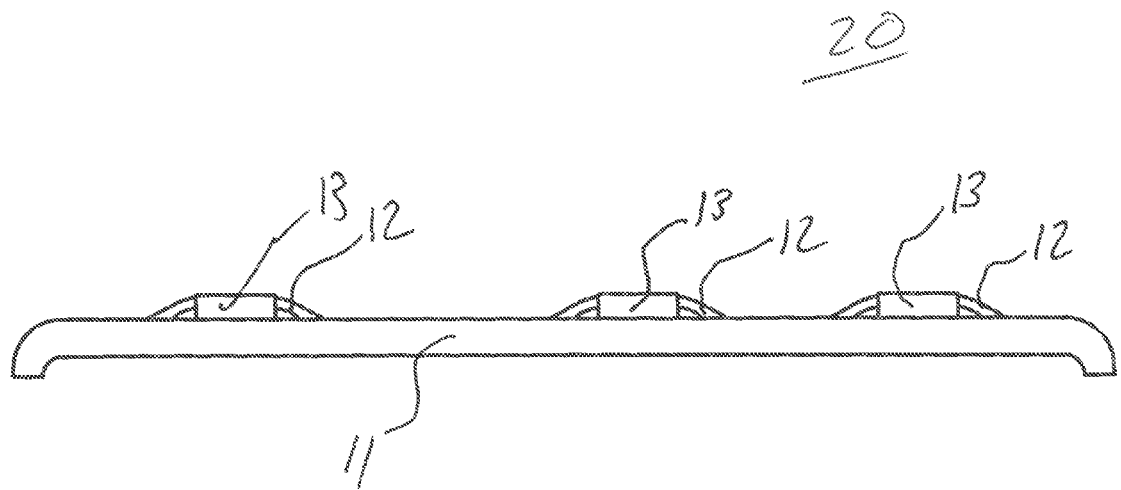
FIG. 8 shows an alternative preferred embodiment of a truck step from a bottom perspective.

Referring now to the drawings wherein the showings are for purposes of illustrating a preferred embodiment of the present invention and not for purposes of limiting the same, FIGS. 1-6 show a first embodiment of the invention with a truck step 10 with two steps comprising a main bar 1 with a loops structure 2 that projects downward and away from the main bar 1. The loop structure 2 optionally has wrap 3 that can partially or completely cover portions of the loop structure 2. In a preferred embodiment the wrap 3 would cover an entire portion of loop structure 2 where a user would step down on to a relatively flat surface for improved grip and balance while entering or exiting a vehicle. Referring to FIG. 3 the step 10 the main bar 1 has a top surface 5, a bottom surface 7, and main bar indentation surface 4. The main bar indentation is referred to as the main bar indentation surface for ease of understanding the drawings, it should be clear that any reference to indentation is intended to mean any indentation into the main bar from the bottom. In an alternative embodiment it is understood that a slight angle from the horizontal plane could accomplish the purpose of the invention which is to provide an easy to access step while maintaining the design element where the appearance of the truck lift is not diminished. The angle is preferably in the horizontal plane but could be up to forty-five degrees. In the case of a slight angle to the indentation, the indentation could act as a catch and direct a person's foot in and down on to the loop structure without having to look down and visualize the loop structure. The main bar 1 is made of typical steel or aluminum and has a circular cross-section or a circular cross-section with a flattened top and bottom surface to provide a wider surface for stepping. The larger the cross-section the stronger the step is if the dimensions of the thickness of the materials are proportional. The key to the invention is that the main bar 1 uses conventional materials for making truck steps but has the additional step of having a main bar indentation surface 4 created by applying a pressure to the bottom surface 7 and with a press push the bottom surface 7 up closer to the top surface 5. The press would be able have a mold with a relatively flat surface to accommodate different widths of main bars which typically are between two to eight inches with a preferred embodiment being between three and six inches. The main bar indentation surface 4 in the preferred embodiment would push bottom surface 7 one to five inches closer to the top surface 5 in the preferred embodiment. The length of the main bar indentation surface 4 would typically complement the length of the loop structure 2. The length of the main bar indentation surface 4 must accommodate at least one human foot and can be longer for design purposes. For example, in the present embodiment the truck step 10 has two loop structures that are approximately fourteen inches in length. In the current market truck owners lift their trucks and put large wheels and tires to raise the height of the vehicle and there is a need for a step so that a user may enter and exit the vehicle. However, also in the current market is the perception that a step lowers the overall clearance of the vehicle. The market has adopted retractable steps that operate in a number of manners usually requiring a motor to raise and lower the step. The problem with raising and lowering is it is an electric-mechanical device that is subject to the elements and breaking down. There is a need in the market to have a step that has a clean line to preserve the overall appearance and clearance of the vehicle while still allowing for a user to easily enter and exit the vehicle. The main bar indentation surface 4 allows the loop structure 2 with or without a wrap 3 creates a clean line and allows the users foot, shoe, or boot to access the loop structure 2. If the main bar indentation surface 4 was not in place a user would have a difficult time accessing the loop structure 2. The overall appearance has a cleaner line with a lower overall profile for the truck step 10. FIG. 4 shows that the preferred embodiment is typical where in the main bar 1 is hollow tubular metal wherein area 6 is hollow.

Figure 10:
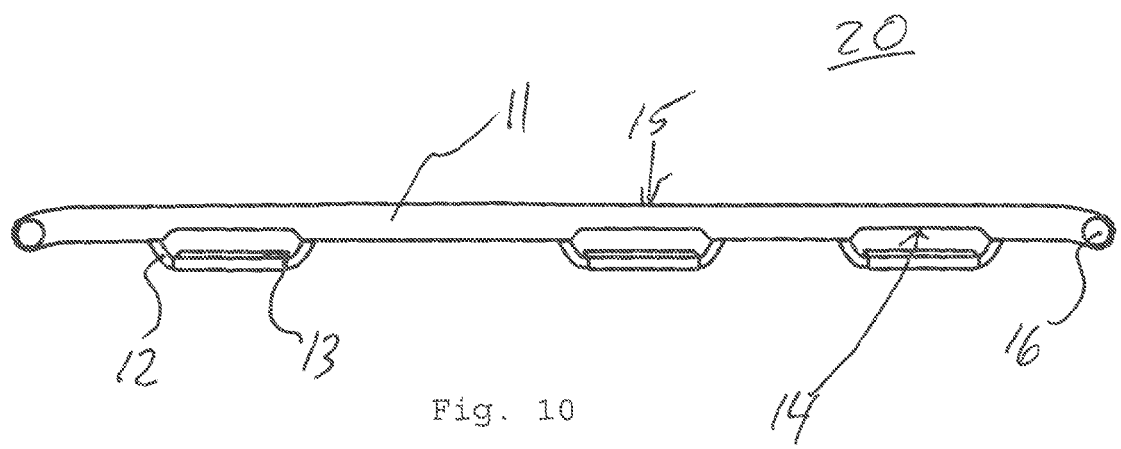
FIG. 10 shows an alternative preferred embodiment of a truck step from a rear perspective.
Figure 11:
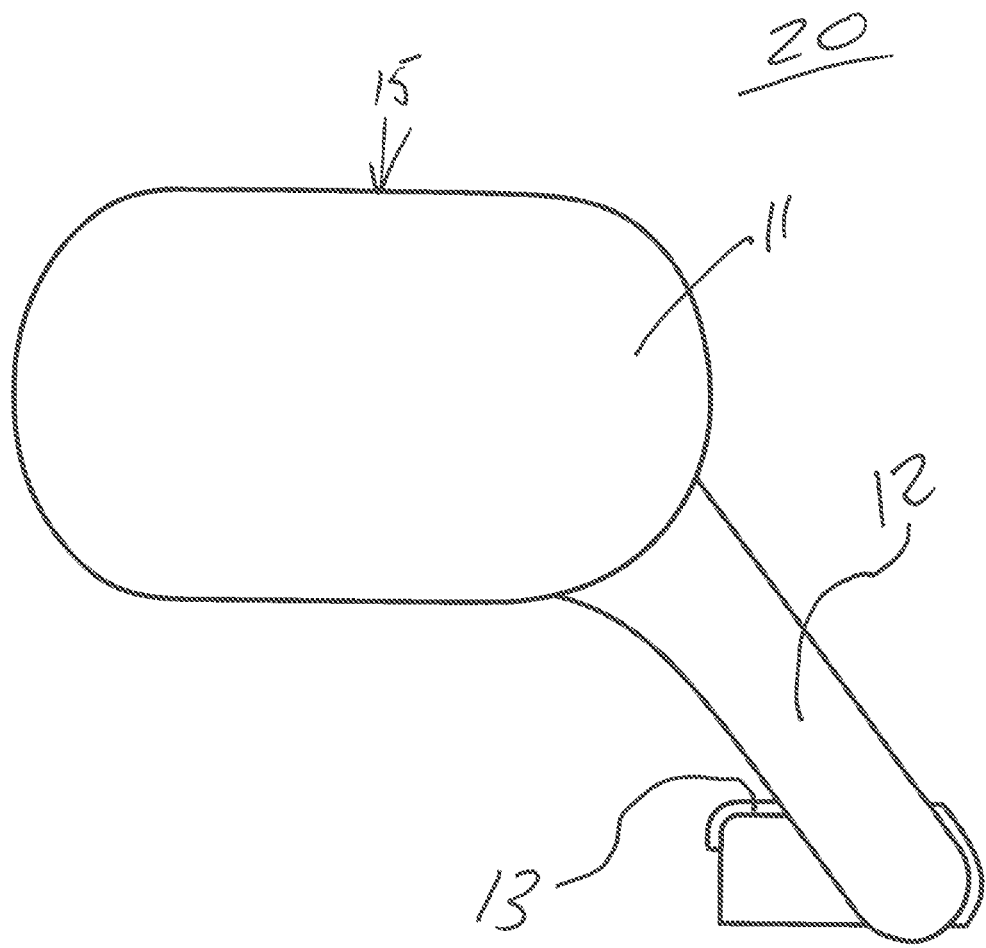
FIG. 11 shows an alternative preferred embodiment of a truck step from a leading end perspective.
Figure 12:
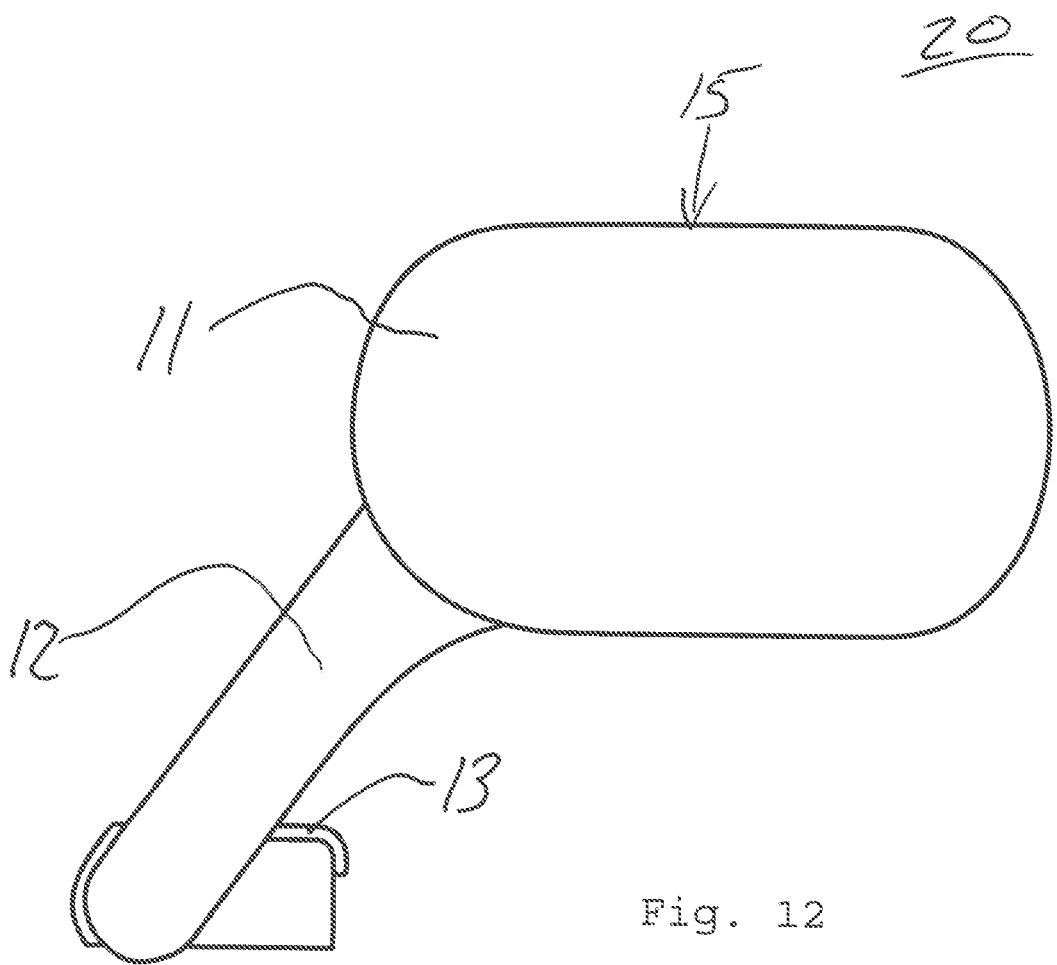
FIG. 12 shows an alternative preferred embodiment of a truck step from a trailing perspective.

However, also in the current market is the perception that a step lowers the overall clearance of the vehicle. The market has adopted retractable steps that operate in a number of manners usually requiring a motor to raise and lower the step. The problem with raising and lowering is it is an electric-mechanical device that is subject to the elements and breaking down. There is a need in the market to have a step that has a clean line to preserve the overall appearance and clearance of the vehicle while still allowing for a user to easily enter and exit the vehicle. The main bar indentation surface 14 allows the loop structure 12 with or without a wrap 13 creates a clean line and allows the users foot, shoe, or boot to access the loop structure 12. If the main bar indentation surface 14 was not in place a user would have a difficult time accessing the loop structure 12. The overall appearance has a cleaner line with a lower overall profile for the truck step 20. FIG. 10 shows that the preferred embodiment is typical where in the main bar 11 is hollow tubular metal wherein area 16 is hollow.

Figure 9:
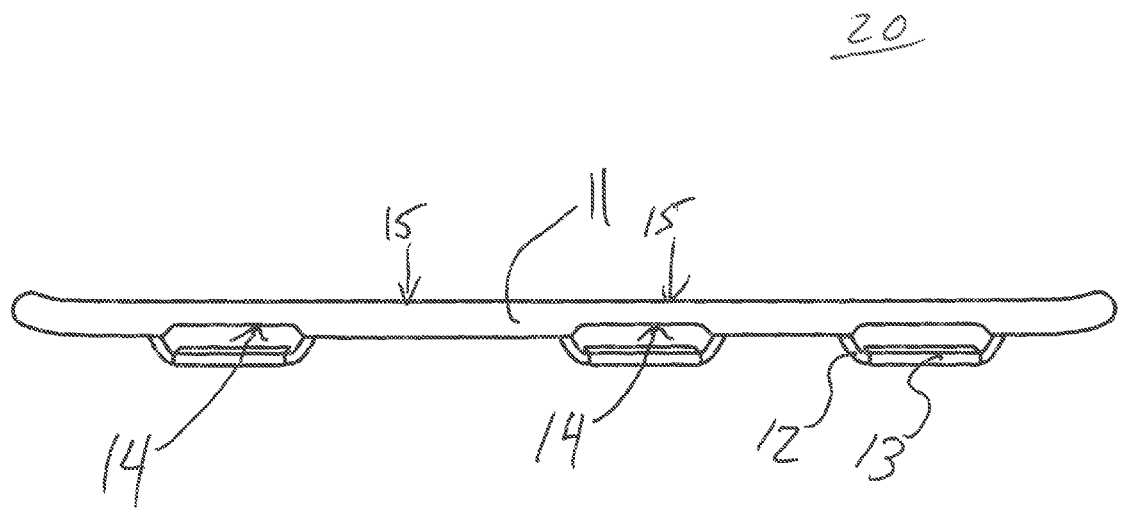
FIG. 9 shows an alternative preferred embodiment of a truck step from a front perspective.

FIGS. 7-12 show an alternative embodiment of the invention with a truck step 20 with three steps comprising a main bar 11 with a loops structure 12 that projects downward and away from the main bar 11. The loop structure 12 optionally has wrap 13 that can partially or completely cover portions of the loop structure 12. In a preferred embodiment the wrap 13 would cover an entire portion of loop structure 12 where a user would step down on to a relatively flat surface for improved grip and balance while entering or exiting a vehicle. Referring to FIG. 9 the step 10 the main bar 11 has a top surface 15, a bottom surface 17, and main bar indentation surface 14. The main bar 11 is made of typical steel or aluminum and has a circular cross-section or a circular cross-section with a flattened top and bottom surface to provide a wider surface for stepping. The larger the cross-section the stronger the step is if the dimensions of the thickness of the materials are proportional. The key to the invention is that the main bar 11 uses conventional materials for making truck steps but has the additional step of having a main bar indentation surface 14 created by applying a pressure to the bottom surface 17 and with a press push the bottom surface 17 up closer to the top surface 15. The press would be able have a mold with a relatively flat surface to accommodate different widths of main bars which typically are between two to eight inches with a preferred embodiment being between three and six inches. The main bar indentation surface 14 in the preferred embodiment would push bottom surface 17 one to five inches closer to the top surface 15. The length of the main bar indentation surface 14 would typically complement the length of the loop structure 12. The length of the main bar indentation surface 14 must accommodate at least one human foot and can be longer for design purposes. For example, in the present embodiment the truck step 20 has two loop structures that are approximately fourteen inches in length. In the current market truck owners lift their trucks and put large wheels and tires to raise the height of the vehicle and there is a need for a step so that a user may enter and exit the vehicle. However, also in the current market is the perception that a step lowers the overall clearance of the vehicle. The market has adopted retractable steps that operate in a number of manners usually requiring a motor to raise and lower the step. The problem with raising and lowering is it is an electric-mechanical device that is subject to the elements and breaking down. There is a need in the market to have a step that has a clean line to preserve the overall appearance and clearance of the vehicle while still allowing for a user to easily enter and exit the vehicle. The main bar indentation surface 14 allows the loop structure 12 with or without a wrap 13 creates a clean line and allows the users foot, shoe, or boot to access the loop structure 12. If the main bar indentation surface 14 was not in place a user would have a difficult time accessing the loop structure 12. The overall appearance has a cleaner line with a lower overall profile for the truck step 20. FIG. 10 shows that the preferred embodiment is typical where in the main bar 11 is hollow tubular metal wherein area 16 is hollow.

Figure 13:
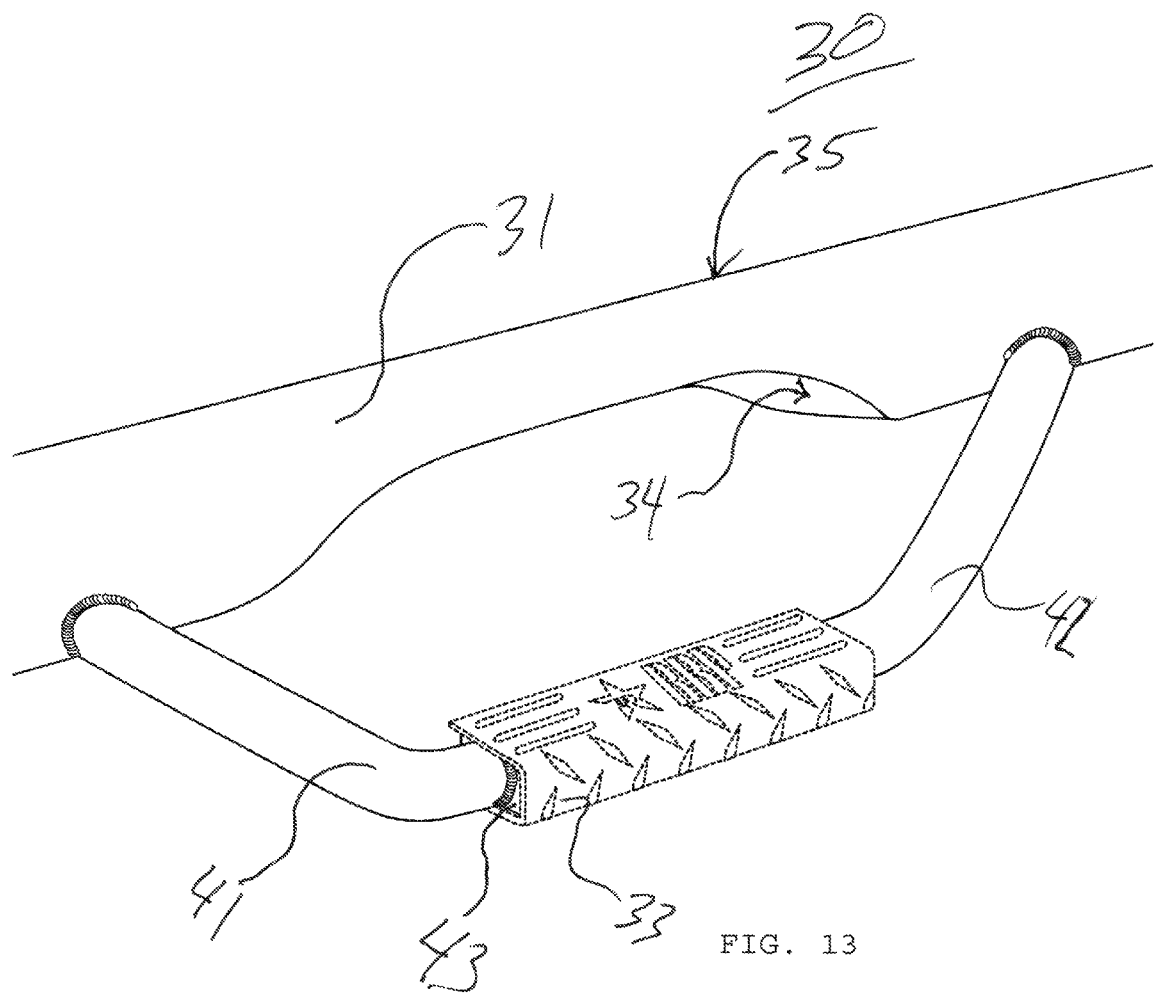
FIG. 13 shows an alternative preferred embodiment of a truck step from a side perspective with welds and a step plate.
Figure 14:
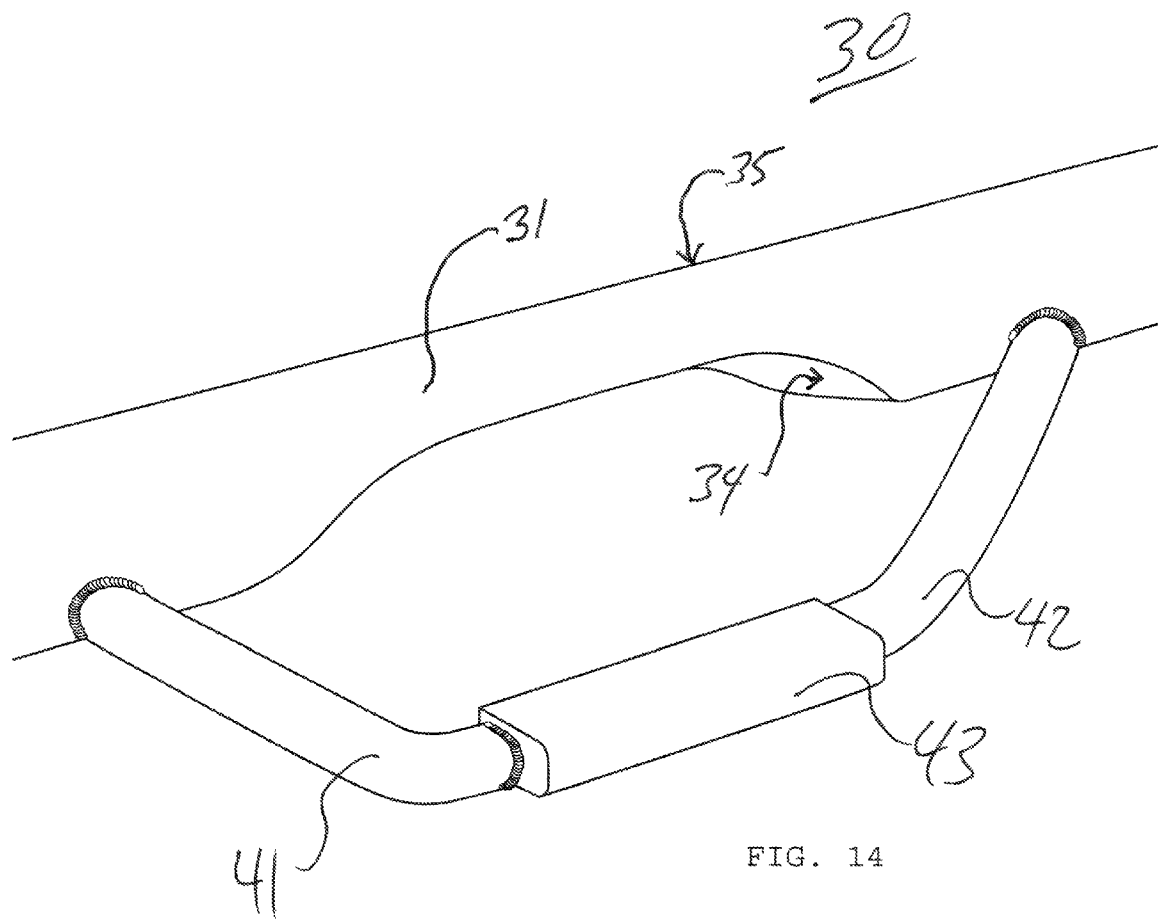
FIG. 14 shows an alternative preferred embodiment of a truck step from a side perspective with welds and no step plate.
Figure 15:
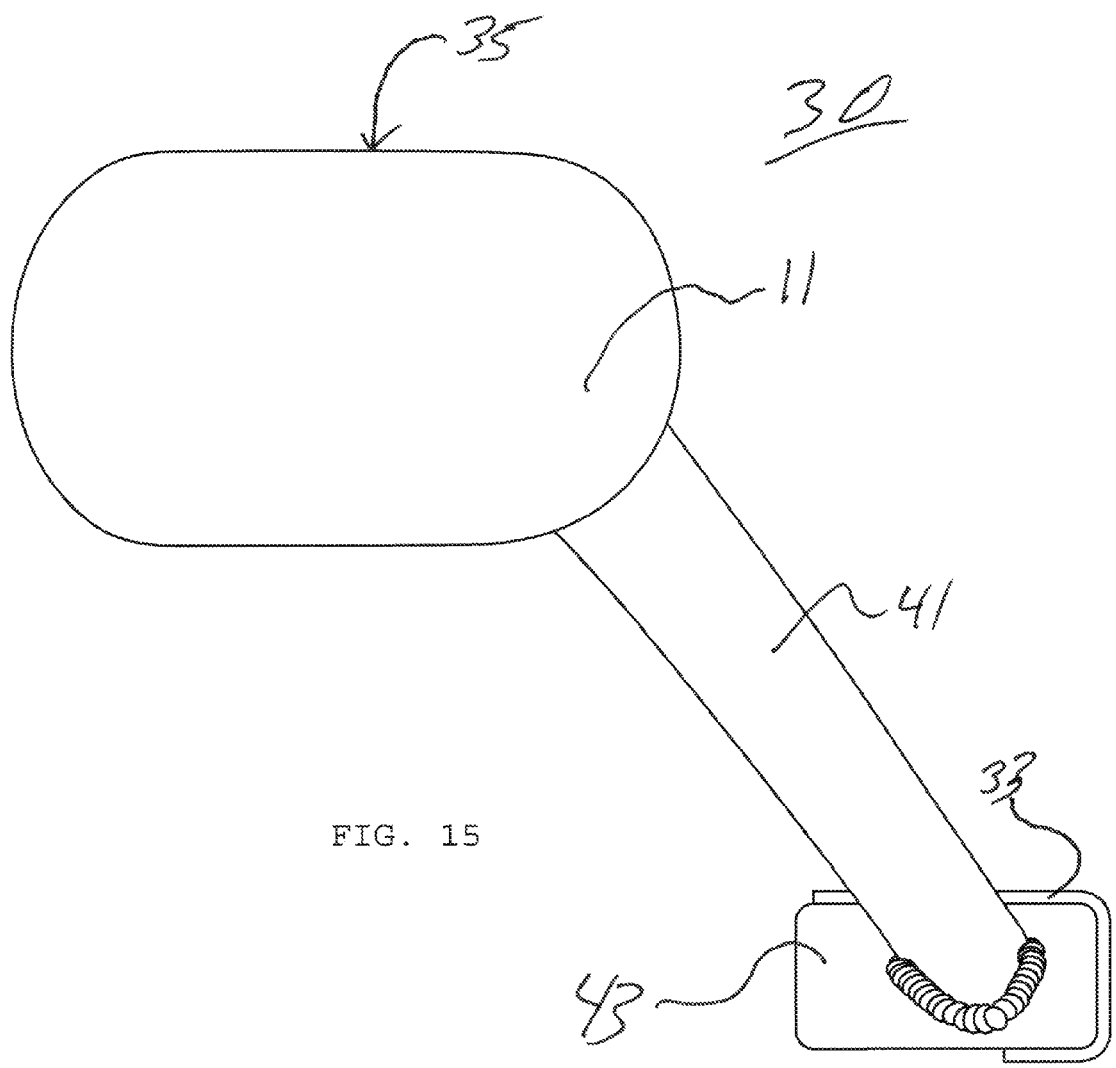
FIG. 15 shows an alternative preferred embodiment of a truck step from a side view with welds and a step plate.
Figure 16:
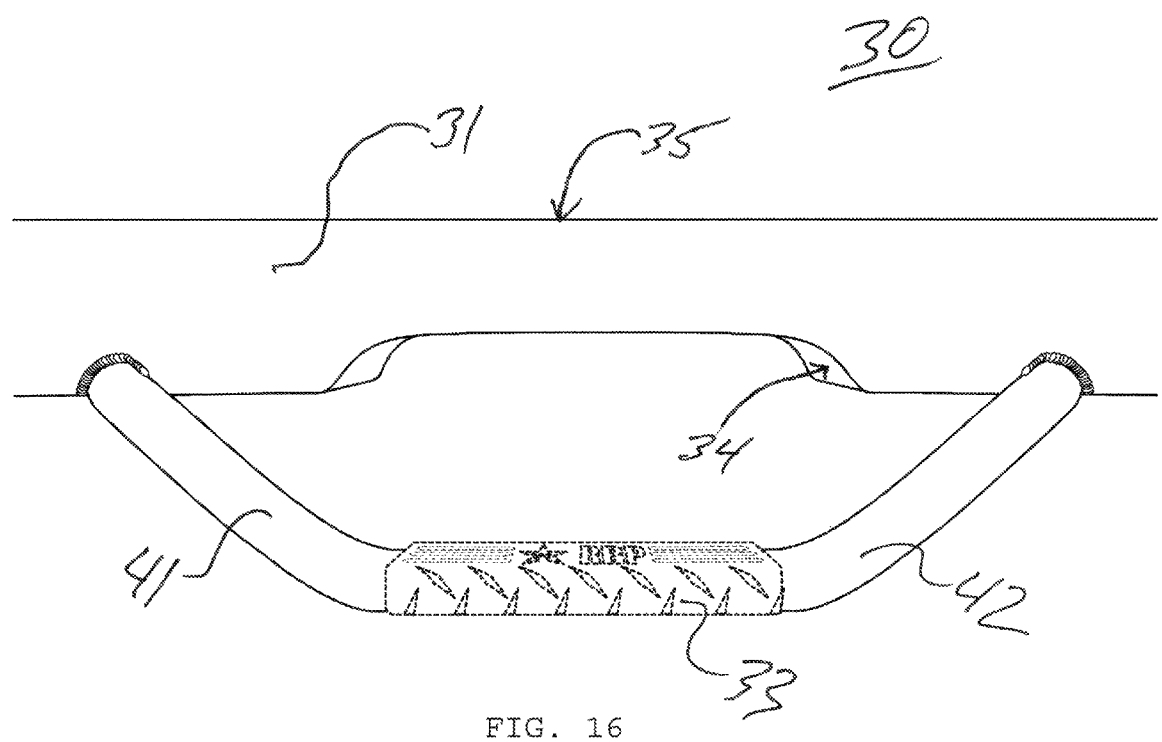
FIG. 16 shows an alternative preferred embodiment of a truck step from a front view with welds and a step plate.
Figure 17:
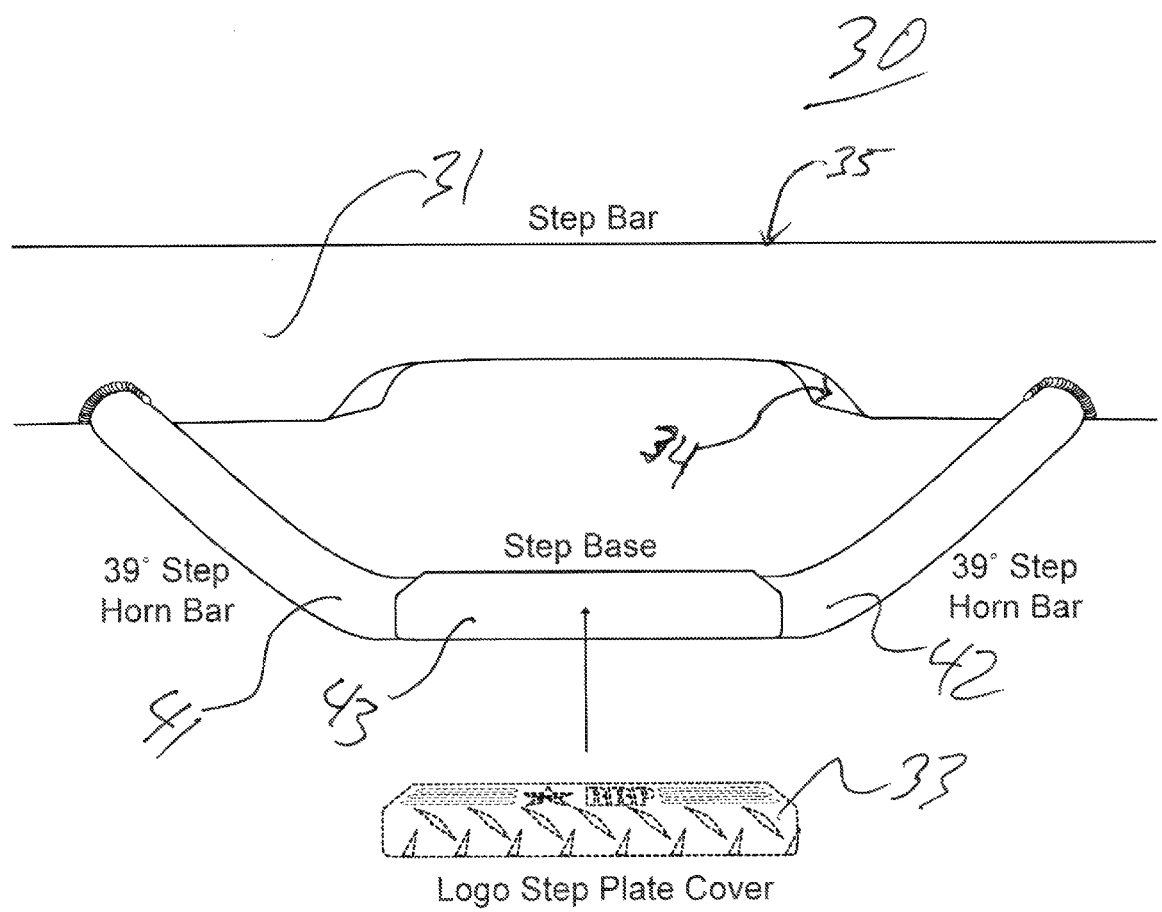
FIG. 17 shows an alternative preferred embodiment of a truck step from a front view with welds and a step plate separate from a step base.

FIGS. 13-17 show an alternative embodiment of the invention with a truck step 30 with a step comprising a main bar 31 with a loops structure 32 that projects downward and away from the main bar 31. The loop structure 32 optionally has wrap 33 that can partially or completely cover portions of the loop structure 32. In a preferred embodiment the wrap 33 could cover an entire portion of loop structure 32 where a user would step down on to a relatively flat surface for improved grip and balance while entering or exiting a vehicle. Alternatively, described below, the wrap 33 would just cover a flat step base 43. Referring to FIGS. 13 and 14 the step 30 the main bar 31 has a top surface 35, a bottom surface 37, and main bar indentation surface 34. The main bar 31 is made of typical steel or aluminum and has a circular cross-section or a circular cross-section with a flattened top and bottom surface to provide a wider surface for stepping. The larger the cross-section the stronger the step is if the dimensions of the thickness of the materials are proportional. The key to the invention is that the main bar 31 uses conventional materials for making truck steps but has the additional step of having a main bar indentation surface 34 created by applying a pressure to the bottom surface 37 and with a press push the bottom surface 37 up closer to the top surface 35. The press would be able have a mold with a relatively flat surface to accommodate different widths of main bars which typically are between two to eight inches with a preferred embodiment being between three and six inches. The main bar indentation surface 34 in the preferred embodiment would push bottom surface 37 one to five inches closer to the top surface 35. The length of the main bar indentation surface 34 would typically complement the length of the loop structure 32 but can be wider or shorter than the loop structure 32. The length of the main bar indentation surface 34 must accommodate at least one human foot and can be longer for design purposes. For example, in the present embodiment the truck step 30 has a loop structure 32 that is comprised of a front horn 41 and a rear horn 42 that are welded to the main bar 31. Further disposed between the front and rear horn 41,42 is a flat step base 43 that is welded in between to the horns 41,42. The horns 41, 42 are approximately fourteen inches in length but can have different lengths and project from the main bar 31 at different angles. The flat step base 43 will generally be four to twenty inches in length but more preferably eight to sixteen inches in length. FIGS. 15 and 16 show truck step 30 with a wrap 33 affixed to the flat step base 43. Generally, wrap 33 will only cover a portion for the flat step base 43 but in certain embodiments could entirely cover the flat step base 43. In the current market truck owners lift their trucks and put large wheels and tires to raise the height of the vehicle and there is a need for a step so that a user may enter and exit the vehicle. FIG. 17 shows the flat base step 43 and separated. The flat base step 43 can be solid or comprised of hollow material to reduce weight or improve strength characteristics. The ability to weld the three elements of the loop structure allows the design unique configurations that cannot be done with currently available tube loop structures with substantially circular or uniform cross-sections. For example, the front horn 41 and rear horn 42 can have different lengths, different cross-sections, and different angle of attachment to the main bar 31 and flat step base 43 creating aggressive or less aggressive appearance to the step 30.

It should be understood that the loop structure described herein is not limited to two or three loops on the main bar, but it is possible to have one loop the full length of the main bar or even longer. Additionally, there could be a series of loop structures the only limitation on the number of loop steps has to do with the size of a loop required for the width of a human foot, in other words the minimum length of a loop structure is four inches. The wrap as disclosed herein is commonly known as a step plate. Step plates are well known in the arts for affixing to steps to improve the look and performance of a step based on a bar shape. While the main bar dimensions have been disclosed as two to eight inches with a preference of three to six inches, the loop structure does not necessarily have the same requirements. The loop structure can be made of tubular metal or solid metal or polymer or a combination thereof.

The foregoing description is, at present, considered to be the preferred embodiments of the present discovery. However, it is contemplated that various changes and modifications apparent to those skilled in the art, may be made without departing from the present discovery. Therefore, the foregoing description is intended to cover all such changes and modifications encompassed within the spirit and scope of the present discovery, including all equivalent aspects. Additional modifications and improvements of the present invention may also be apparent to those skilled in the art. Thus, the particular combination of parts described and illustrated herein in intended to represent only one embodiment of the invention, and is not intended to serve as limitations of alternative devices within the spirit and scope of the invention.

What is claimed is:

1. A truck step comprising:
   a main bar with at least one loop structure attached to the main bar and wherein the main bar has a top surface and a bottom surface wherein a bottom surface portion is indented to form a main bar indentation surface.

2. The truck step of claim 1 wherein the main bar indentation surface is positioned just over the loop structure.

3. The truck step of claim 1 wherein the main bar indentation surface is positioned just over the full length of the loop structure.

4. The truck step of claim 1 wherein there are one to twenty loop structures.

5. The truck step of claim 1 wherein the main bar is between two and eight inches in diameter.

6. The truck step of claim 1 wherein the loop structure has a wrap.

7. The truck step of claim 1 wherein the bottom surface portion is indented so that the main bar indentation surface is within one to five inches of the top surface.

\* \* \* \* \*